UNITED STATES PATENT OFFICE.

PERCY HUTCHINGS CARTER, OF SAVANNAH, GEORGIA.

PROCESS OF MAKING FERTILIZER MATERIALS.

1,279,838.  Specification of Letters Patent.  Patented Sept. 24, 1918.

No Drawing. Application filed July 1, 1916, Serial No. 107,189. Renewed July 17, 1918. Serial No. 245,402.

*To all whom it may concern:*

Be it known that I, PERCY H. CARTER, a citizen of the United States, residing at Savannah, in the county of Chatham and State of Georgia, have invented certain new and useful Improvements in Processes of Making Fertilizer Materials, of which the following is a specification.

The present invention relates to a process of producing fertilizer material, containing solidified "fertilizer stick" obtained from slaughter houses, garbage plants, fish factories and the like.

An important object of this invention is to provide a process for successfully and economically converting "fertilizer stick", which is normally semi-liquid, viscous and deliquescent, into a solid and non-deliquescent condition whereby it is adapted for use as a fertilizer constituent.

Another object of the invention is to provide a process of treating phosphate rock to render it available for use as a fertilizer, and, at the same time, yield a product which is adapted for causing the "stick" to harden and set.

A further object of this invention is to provide an inexpensive fertilizer material having a high stimulative influence on plant life, possessing great value as a soil improver and plant food, and adapted, when added to soils, to produce particularly favorable conditions for the rapid and extensive development of beneficial soil bacteria.

Other objects and advantages of the invention will be apparent from the following specifications.

As is well known, the "stick" obtained from slaughter houses, garbage plants, fish factories, and the like, contains ammonia, in considerable amounts, and is valuable as a fertilizer constituent. The material is, however, normally semi-liquid, viscous and deliquescent which prevents its use, without further treatment, as a fertilizer constituent and great difficulty has heretofore been experienced in converting the semi-liquid material into a solid form and stable condition.

I have discovered that the "stick" can be readily and economically converted into a solid form and non-deliquescent condition by the action thereon of a metal sulfate such as niter-cake, and that the conversion can be advantageously carried out by treating a solution of niter-cake with tri-calcium phosphate whereby, as I have found by experience, the phosphate is not only rendered available for use as a plant food but the "stick" is solidified, and its viscosity and deliquescence overcome.

In the practice of my process in its preferred form, I dissolve niter-cake in approximately an equal amount by weight of water, allow the solution to settle and draw off the clear supernatent liquid. The acidity of the solution is then determined, and sufficient alkaline earth metal phosphate, preferably phosphate rock, is added to take up the acidity of the niter-cake. As a result of this reaction, a compound is formed containing approximately eight per cent. of available phosphoric acid. Immediately after adding the phosphate rock to the solution as above described, I add the "stick", preferably employing one part by weight of this material and three parts by weight of the solution. The mixture is stirred until it becomes thoroughly homogeneous, and is then run into suitable molds and allowed to set or harden therein. The mixture hardens and dries readily, and is not deliquescent. It has been found to contain as high as 10 per cent. of available phosphoric acid, and over 3 per cent. of ammonia. However, if too much "fertilizer stick" is added for the purpose of increasing the percentage of ammonia, the resulting compound will not properly harden and dry out.

The process yields a product which is rich in protein matter, free phosphoric acid and ammoniacal nitrogen, and is adapted to produce a rapid and plenteous crop response when used as a fertilizer constituent.

While I have described in detail the preferred practice of my process, and proportions of ingredients employed therein, it is to be understood that such process is not limited to the exact details of procedure set forth, nor to the proportion of ingredients recited, but that these may be widely varied without departing from the spirit of my invention or the scope of the subjoined claims.

Having thus described my invention, I claim:

1. The herein described process of producing a fertilizer or fertilizer constituent, which consists in subjecting a solution of niter-cake to the action of phosphate rock, subjecting "fertilizer stick" to the action of the resultant composition, and allowing the mass to dry and harden.

2. The herein described process of producing a fertilizer or fertilizer constituent, which consists in subjecting niter-cake to the action of a tri-calcium phosphate in the presence of water, subjecting "fertilizer stick" to the action of the resultant composition, and allowing the mass to dry and harden.

In testimony whereof I affix my signature in presence of two witnesses.

PERCY HUTCHINGS CARTER.

Witnesses:
FREDERICK T. SAUSSY,
J. G. MORRIS.